US010534655B1

(12) United States Patent
Kinney, Jr. et al.

(10) Patent No.: US 10,534,655 B1
(45) Date of Patent: Jan. 14, 2020

(54) JOB SCHEDULING BASED ON JOB EXECUTION HISTORY

(71) Applicant: Amazon Technologies, Inc., Seattle, WA (US)

(72) Inventors: James Edward Kinney, Jr., Seattle, WA (US); Dougal Stuart Ballantyne, Seattle, WA (US); Nishant Mehta, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 60 days.

(21) Appl. No.: 15/188,865

(22) Filed: Jun. 21, 2016

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01); *G06F 9/5027* (2013.01)

(58) Field of Classification Search
CPC ..... G06F 9/5083; G06F 9/4881; G06F 9/5027
See application file for complete search history.

(56) References Cited

U.S. PATENT DOCUMENTS

| 7,093,004 | B2 | 8/2006 | Bernardin et al. |
| 7,454,754 | B2 | 11/2008 | Tajima |
| 7,930,398 | B2 | 4/2011 | Kawato |
| 7,979,859 | B2 | 7/2011 | Li et al. |
| 8,245,237 | B2 | 8/2012 | Tajima |
| 8,689,229 | B2 | 4/2014 | Tajima |
| 9,172,628 | B2 | 10/2015 | Barsness et al. |
| 2007/0016907 | A1* | 1/2007 | Benedetti .............. G06F 9/5038 718/104 |
| 2013/0212583 | A1* | 8/2013 | Gordon ..................... G06F 9/44 718/100 |
| 2014/0229221 | A1* | 8/2014 | Shih ................. G06Q 10/06313 705/7.23 |
| 2016/0098292 | A1* | 4/2016 | Boutin .................... G06F 9/505 718/104 |
| 2017/0116038 | A1* | 4/2017 | Netto ..................... G06F 9/4881 |
| 2017/0134330 | A1* | 5/2017 | Clark ....................... H04L 51/30 |

OTHER PUBLICATIONS

U.S. Appl. No. 15/360,948, filed Nov. 23, 2016, Dougal Stuart Ballantyne, et al.

\* cited by examiner

*Primary Examiner* — Jacob D Dascomb
(74) *Attorney, Agent, or Firm* — Robert C. Kowert; Kowert, Hood, Munyon, Rankin & Goetzel, P.C.

(57) ABSTRACT

Methods, systems, and computer-readable media for job scheduling based on job execution history are disclosed. A request is received to schedule a workload comprising a plurality of jobs. A resource allocation score for the workload is determined. The resource allocation score represents (at least in part) an estimated likelihood of successful execution of the workload. A first portion of the workload is scheduled for execution, and a remaining portion (if any) of the workload is delayed. A quantity of jobs in the first portion of the workload is determined based (at least in part) on the resource allocation score. Execution of the first portion of the workload is initiated.

20 Claims, 7 Drawing Sheets

JOB SCHEDULING BASED ON JOB EXECUTION HISTORY

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner. The use of virtualization with cloud computing resources to run client programs may enable some clients to access a much greater amount of computing capacity at a given time than would be possible with the clients' on-premises resources. If a program supplied by a client is flawed, however, then the client may also cause concurrent failures on a much larger scale than would be possible with the client's on-premises resources.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for job scheduling based on job execution history are described. Using the techniques described herein, a resource allocation score for jobs in a workload may be used to allocate usage of computing resources. A job scheduling system may determine a resource allocation score for a workload that has been supplied by a user. A resource allocation score may generally represent (at least in part) an estimated likelihood of successful execution of a set of jobs. A resource allocation score may be based on components such as the job execution history for the user, the job execution history for any groups to which the user belongs, the job execution history for the particular type(s) of jobs in the workload, the job execution history for a project to which the workload belongs, and/or any suitable combination of components. The job execution history may include metrics related to the successes and failures of jobs that have been attempted in the past. Based on the resource allocation score for the workload, the job scheduling system may schedule an initial portion of jobs in the workload while delaying the remainder of the jobs in the workload. The quantity of the initial portion of jobs may vary based on the resource allocation score. For example, for a better resource allocation score (as defined in any suitable range of values), a relatively larger percentage of the workload may be scheduled for execution without delay; for a worse resource allocation score, a relatively smaller percentage of the workload may be scheduled for execution without delay. To execute jobs, the job scheduling system may reserve (e.g., provision, potentially by interacting with a resource manager) computing resources in a multi-tenant provider network or computing resources on client premises. After execution is initiated for the initial portion of jobs in the workload, the resource allocation score may rise or fall based on the success or failure of that initial portion of jobs. The success or failure may be determined based on a successful or failed launch (e.g., initial execution without failure for a brief period of time), execution without failure for a longer period of time, and/or the exit codes for jobs. As the resource allocation score rises, larger portions of the workload may be scheduled until the entire workload has been processed. As the resource allocation score falls, smaller portions of the workload may be scheduled or further processing of the workload may be terminated prematurely. In this manner, the likelihood may be reduced of launching, on behalf of a user, a large number of concurrent jobs that fail.

Figure 1:
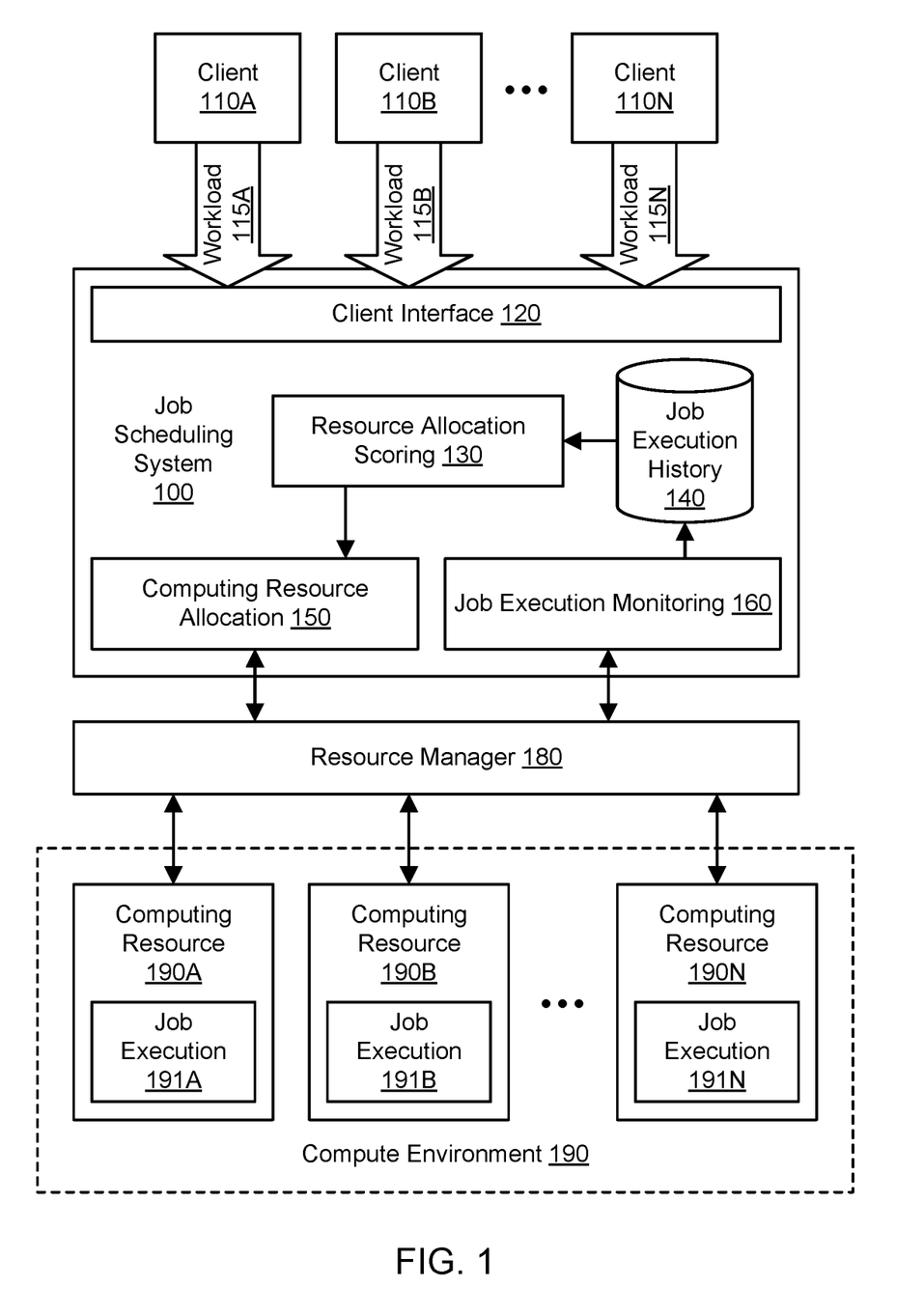
FIG. 1 illustrates an example system environment for job scheduling based on job execution history, according to one embodiment.

FIG. 1 illustrates an example system environment for job scheduling based on job execution history, according to one embodiment. A job scheduling system 100 may manage the scheduling of jobs that are intended to be executed in a compute environment 190. The job scheduling system 100 may include a client interface 120 that permits interaction with the clients 110A-110N, e.g., such that the client can submit workloads 115A and 115B through 115N as well as related instructions and/or job metadata. The job scheduling system 100 may include a functionality for resource allocation scoring 130. Using the functionality for resource allocation scoring 130, the job scheduling system 100 may determine resource allocation scores for workloads 115A-115N. A resource allocation score may generally represent an estimated likelihood of successful execution of the workload. The job scheduling system 100 may include a repository 140 for storing job execution history data. The resource allocation scores may be determined based (at least in part) on the job execution history 140.

The job scheduling system 100 may include a functionality for computing resource allocation 150. Using the functionality for computing resource allocation 150, the job scheduling system 100 may reserve (by interacting with the resource manager 180) and allocate usage of computing resources 190A-190N in a compute environment 190 for a portion of a workload. The size of the portion of the workload may be determined based (at least in part) on the resource allocation score for the workload, such that a larger set of jobs may be scheduled for execution for a more trustworthy resource allocation score than for a less trustworthy resource allocation score. The job scheduling system 100 may include a functionality for job execution monitoring 160. Using the functionality for job execution monitoring 160, the job scheduling system 100 may assess the success or failure of execution (or attempted execution) of a portion of a workload. As jobs are executed successfully or unsuccessfully, the resource allocation score for the remainder of the workload may be increased or decreased, respectively.

The client devices 110A-110N may encompass any type of client configurable to submit workloads 115A-115N to the job scheduling system. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make interact with the client interface 120 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 110A-110N may be configured to generate network-based service requests according to a Representational State Transfer (REST)-style network-based services architecture, a document- or message-based network-based services architecture, or another suitable network-based services architecture. In some embodiments, one of the client devices 110A-110N may be configured with access to a virtual compute instance in the compute environment 190 in a manner that is transparent to applications implement on the client device utilizing computational resources provided by the virtual compute instance. In at least some embodiments, client devices 110A-110N may provision, mount, and configure storage volumes implemented at storage services within the compute environment 190 for file systems implemented at the client devices.

Client devices 110A-110N may convey network-based service requests to the job scheduling system network 100 via one or more networks. In various embodiments, the network(s) may encompass any suitable combination of networking hardware and protocols necessary to establish network-based communications between client devices 110A-110N and job scheduling system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given client device and the job scheduling system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the job scheduling system 100. It is noted that in some embodiments, client devices 110A-110N may communicate with job scheduling system 100 using a private network rather than the public Internet.

Figure 7:
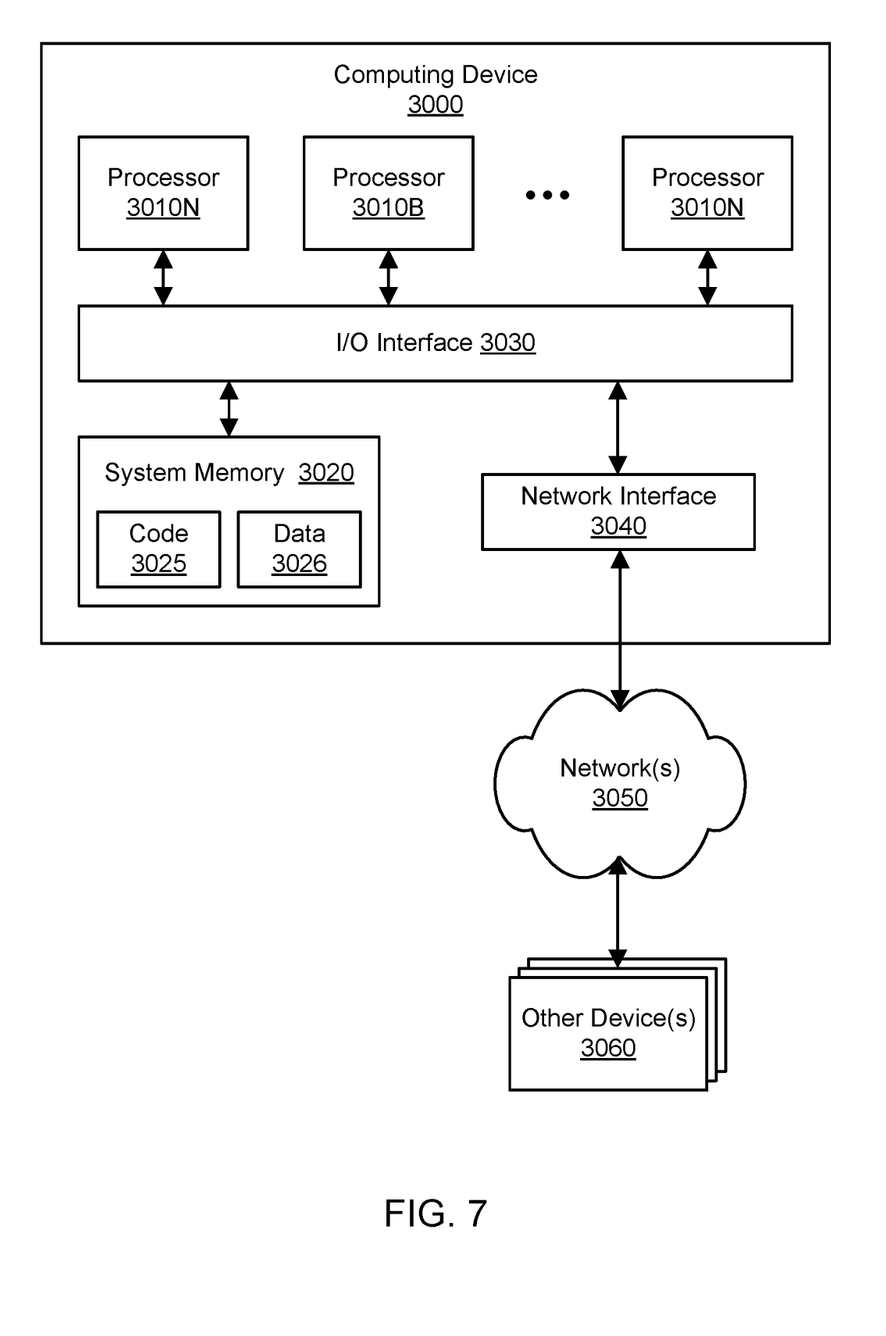
FIG. 7 illustrates an example computing device that may be used in some embodiments.

The job scheduling system 100 may include a plurality of computing devices, any of which may be implemented by the example computing device 3000 illustrated in FIG. 7. In various embodiments, portions of the described functionality of the job scheduling system 100 may be provided by the same computing device or by any suitable number of different computing devices. If any of the components of the job scheduling system 100 are implemented using different computing devices, then the components and their respective computing devices may be communicatively coupled, e.g., via a network. Each of the illustrated components may represent any combination of software and hardware usable to perform their respective functions. It is contemplated that the job scheduling system 100 may include additional components not shown, fewer components than shown, or different combinations, configurations, or quantities of the components shown The client devices 110A-110N may represent or correspond to various clients, users, or customers of the job scheduling system 100 and potentially of the compute environment 190. The clients, users, or customers may represent individual persons, businesses, other organizations, and/or other entities. The client devices 110A-110N may be distributed over any suitable locations or regions. Each of the client devices 110A-110N may be implemented using one or more computing devices, any of which may be implemented by the example computing device 3000 illustrated in FIG. 7. The clients 110A-110N may be coupled to the job scheduling system 100 via one or more networks, potentially including the Internet. Although three clients 110A, 110B, and 110N are shown for purposes of illustration and example, it is contemplated that any suitable number and configuration of client devices may be used to provide jobs to the job scheduling system 100.

The compute environment 190 may include a plurality of computing resources such as resources 190A and 190B through 190N. The resources offered by the compute environment 190 may vary in type, configuration, availability, cost, and other characteristics. The resources may include compute instances, storage instances, and so on. As shown in the example of FIG. 1, the computing resource 190A may include a compute instance that is configured with a capability for job execution 191A. Similarly, the computing resource 190B may include a compute instance that is configured with a capability for job execution 191B, and the computing resource 190N may include a compute instance that is configured with a capability for job execution 191N. Although three computing resources 190A, 190B, and 190N are shown for purposes of illustration and example, it is contemplated that any suitable number and configuration of computing resources may be used to execute jobs provided by the job scheduling system 100. It is contemplated that the compute environment 190 may include additional components not shown, fewer components than shown, or different combinations, configurations, or quantities of the components shown.

Figure 2:
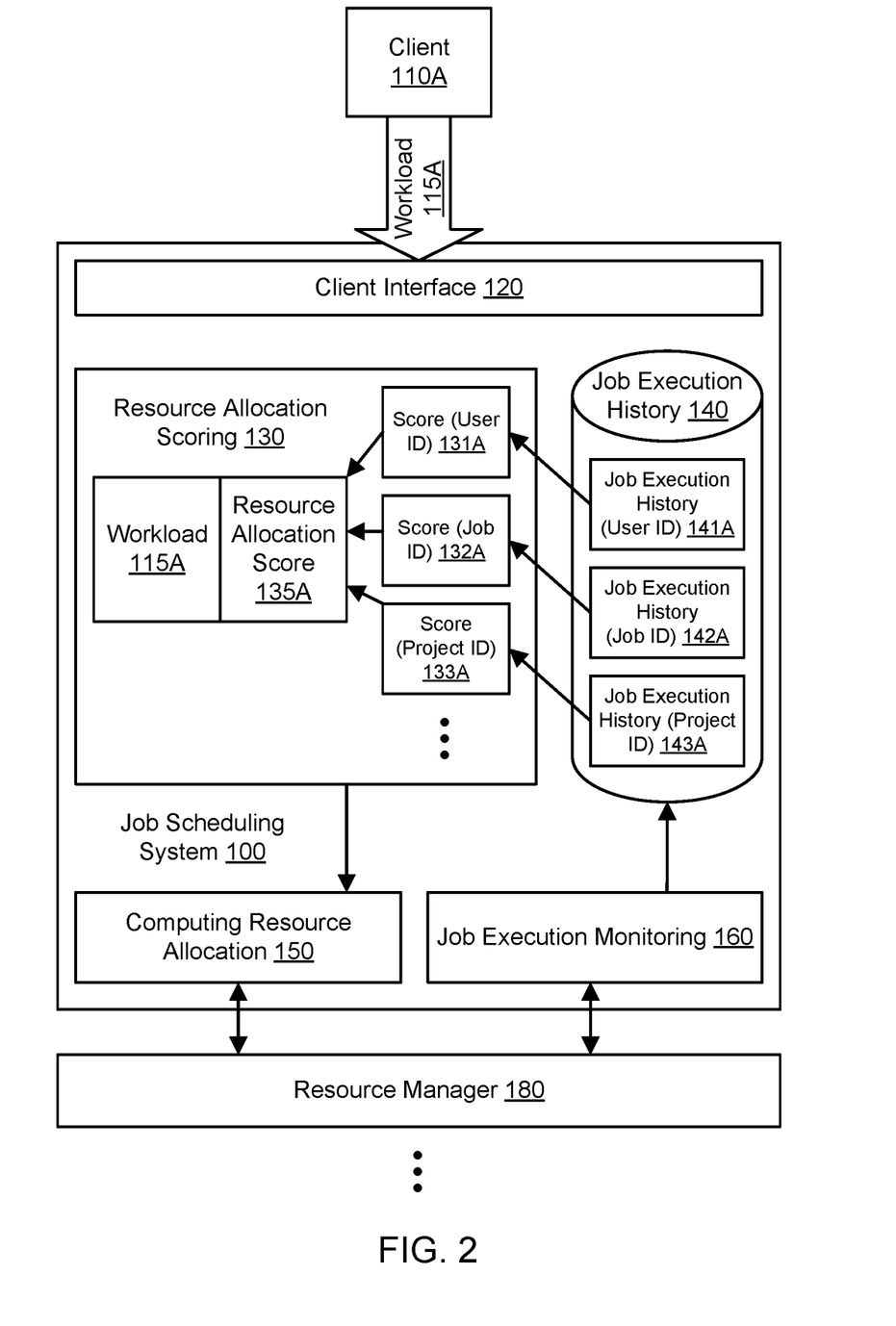
FIG. 2 illustrates further aspects of the example system environment for job scheduling based on job execution history, including different components of a resource allocation score, according to one embodiment.

FIG. 2 illustrates further aspects of the example system environment for job scheduling based on job execution history, including different components of a resource allocation score, according to one embodiment. A workload 115A may be received from a client device 110A operated by or associated with user (potentially part of a client organization). The workload 115A may be received by the job scheduling system 100 from a user of the system through any appropriate client interface 120, potentially including one or more application programming interface(s) (APIs), other programmatic interfaces, and/or user interfaces. The workload 115A may include a set of jobs as defined by one or more job definitions. A job definition may include or reference program instructions to be executed in processing the job. The job definition may include or be associated with a job identifier. A job definition may include or reference a set of input data to be processed using the program instructions. A job definition may also include or be associated with other suitable metadata, including timing information (e.g., a time to begin processing the workload, an anticipated time to run the workload, and/or a deadline), budgetary information, anticipated resource usage (e.g., anticipated processor usage, memory usage, storage usage, network usage), and so on. The user may access the job scheduling system with a user account that is associated with an account name or other user identifier. The user may belong to an organization (e.g., a business entity) that is a client or customer of the job scheduling system, e.g., with an arrangement in place to pay fees for use of the job scheduling system and/or multi-tenant provider network. The user account may be controlled by an individual user or by multiple users within an organization.

The job scheduling system 100 may support different types of jobs such as basic jobs, array jobs, and parallel jobs. A basic job may represent a command or shell script that will be executed once or retried until it is considered to have failed. An array job may represent a job that shares common parameters, such as virtual compute instances and memory, and that runs as a collection of related but separate basic jobs, potentially in parallel across multiple hosts. Examples of typical array jobs may include Monte Carlo simulations, parametric sweeps, and large rendering jobs. A parallel job may represent a parallel, tightly coupled workload, potentially using many compute instances running concurrently. Jobs may also be submitted as parts of workflows, such that some jobs may be scheduled only if their dependencies are met.

Using the resource allocation scoring functionality 130, a resource allocation score 135A may be determined for the workload 115A. The resource allocation score 135A may generally represent an estimated likelihood of successful execution of the workload 115A. The resource allocation score 135A may be a numeric value within a particular range, e.g., a value from zero (representing the least trustworthy score) to one thousand (representing the most trustworthy score). The resource allocation score 135A may be a non-numeric value, e.g., a category of trustworthiness such as "poor," "average," "good," or "excellent." In one embodiment, the resource allocation score 135A may be a numeric component that exist with a range having sub-ranges with non-numeric labels (e.g., "poor," "average," "good," and "excellent").

The resource allocation score 135A may be determined based (at least in part) on a job execution history 140. The job execution history 140 may generally represent any successes and/or failures in attempting to execute jobs in the past. The resource allocation score 135A or job execution history 140 may include multiple components. For example, the job execution history may include the job execution history 141A for a user identifier of the user who submitted the workload, the job execution history for a user group to which the user belongs, the job execution history 142A for a job identifier for the workload, the job execution history 143A for a project identifier for a project to which the workload belongs, or any suitable combination thereof. For example, a user's job execution history 141A may include aggregate success metrics for jobs submitted by that user that launched successfully or unsuccessfully, continued processing successfully or unsuccessfully beyond a threshold duration, and/or exited successfully or unsuccessfully. Similarly, the job execution history 142A for a job identifier may include aggregate success metrics for prior attempts to execute the same type of job, such as jobs that launched successfully or unsuccessfully, continued processing successfully or unsuccessfully beyond a threshold duration, and/or exited successfully or unsuccessfully. In one embodiment, both users and workloads may have resource allocation scores, and a user's score may influence the score for a workload submitted by that user. As shown in the example of FIG. 2, the main resource allocation score 135A may be determined based on multiple components, such as a resource allocation score 131A associated with the user identifier (and determined based on the job execution history 141A for the user identifier), a resource allocation score 132A associated with the job identifier (and determined based on the job execution history 142A for the job identifier), and a resource allocation score 133A associated with the project identifier (and determined based on the job execution history 143A for the project identifier). Various components of the overall resource allocation score 135A may be assigned different weights according to automated application of a policy or otherwise by an administrator.

The resource allocation score 135A may be determined based (at least in part) on automated implementation of one or more policies, e.g., by the job scheduling system 100. For example, for a user who has no relevant job execution history, a policy may be applied to assign a moderate resource allocation score (e.g., 500 on a scale from 0 to 1000) to the workload to indicate medium trustworthiness.

The resource allocation score for a user with an extensive history of successful jobs may typically be higher than that of a new and unknown user, and the resource allocation scores for their workloads may differ accordingly. As another example, for a job type that has no relevant job execution history but is submitted by a user with a sufficiently trustworthy history or resource allocation score, a policy may be applied to assign a better resource allocation score (e.g., 600 on a scale from 0 to 1000) to the workload to indicate a higher degree of trustworthiness. If both the job type and user have histories of success, then a policy may be applied to assign an even better resource allocation score (e.g., 800 on a scale from 0 to 1000) to the workload to indicate an even higher degree of trustworthiness. As histories of success are developed for users and job types, the workloads by those users and of those job types may be allocated more resources and thus a higher degree of concurrency.

After the initial resource allocation score is assigned to a workload or user, a resource allocation score may be raised or lowered based on application of policies. For example, only a small number of failed jobs may cause a resource allocation score to drop steeply based on a policy, where the policy is potentially applied based on one or more user attributes. As another example, the degree to which a resource allocation score is raised or lowered for a workload based on execution of a portion of that workload may be affected by a policy, where the policy is potentially applied based on one or more user attributes. The velocity at which a resource allocation score is raised may differ from the velocity at which a resource allocation score is lowered based on automated application of a policy. Policies may be default policies or may be set by one or more administrators.

The resource allocation score 135A may also be determined based (at least in part) on a manual exception made by an administrator, e.g., an administrator of the job scheduling system or an administrator of the client organization to which the user belongs. For example, the resource allocation score for a high-ranking member of a client organization may be manually set to a high (trustworthy) score. As another example, an administrator may intervene to raise a low (untrustworthy) score for a particular user as part of a customer support operation.

Figure 3:
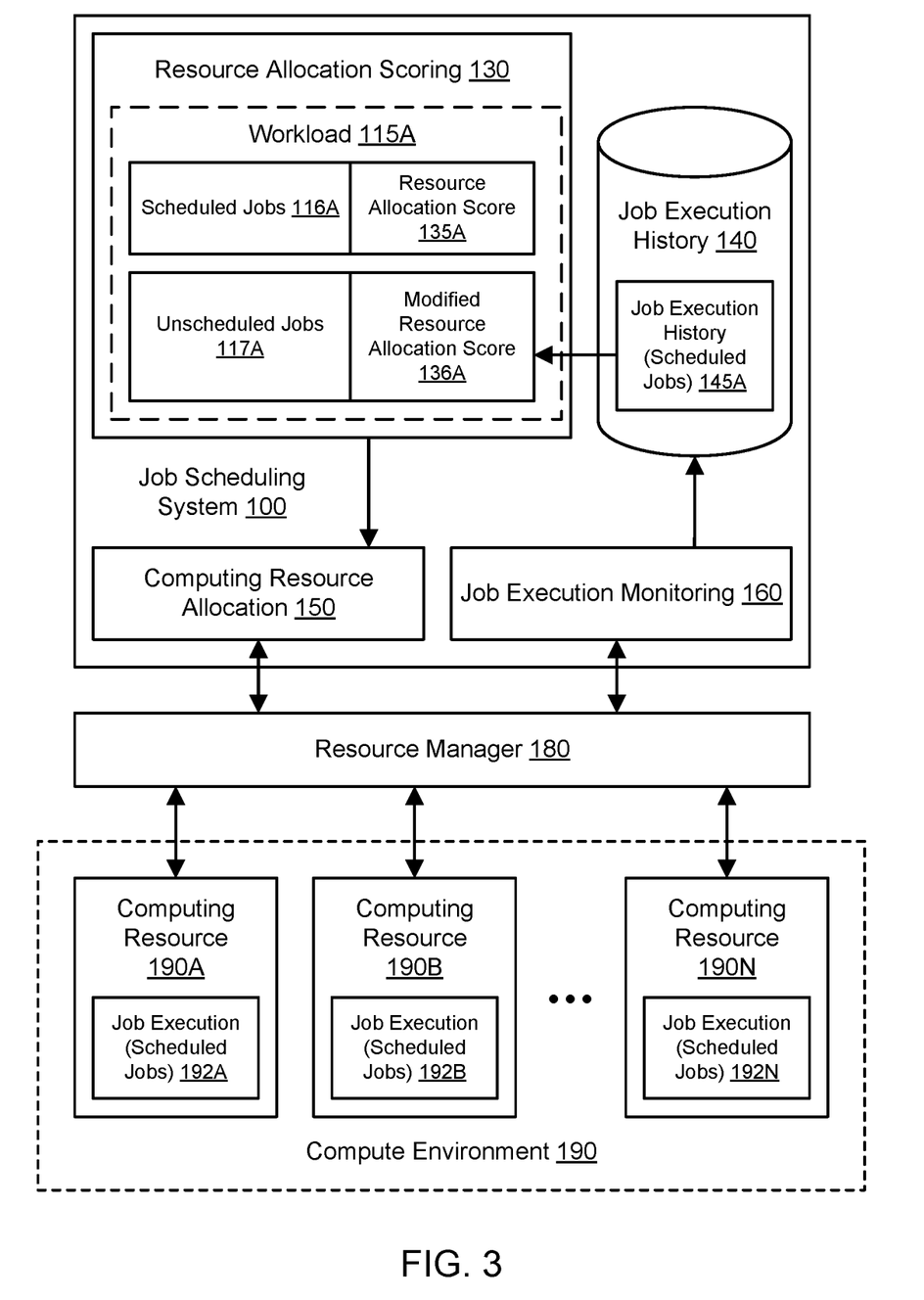
FIG. 3 illustrates further aspects of the example system environment for job scheduling based on job execution history, including modification of a resource allocation score within a workload following attempted job execution, according to one embodiment.

FIG. 3 illustrates further aspects of the example system environment for job scheduling based on job execution history, including modification of a resource allocation score within a workload following attempted job execution, according to one embodiment. An initial portion of the workload 115A may be scheduled for attempted execution. The quantity of jobs in the initially scheduled portion 116A may be determined based (at least in part) on the initial resource allocation score 135A for the workload. For example, if the resource allocation score is moderate or low, then only 1% of the jobs may be scheduled; if the resource allocation score is high, then 10% of the jobs may be scheduled; and if the resource allocation score is very high, then 50% of the jobs may be scheduled. In one embodiment, if a resource allocation score for a workload is the most trustworthy score (e.g., 1000 on a scale from 0 to 1000), then 100% of the workload (or whatever remains of the workload) may be scheduled without delay. The mapping of resource allocation scores to percentages of a workload to launch initially may be determined by automated application of a policy. The remainder of the jobs 117A in the workload may be delayed indefinitely, such that those jobs may remain in a queue or other data structure managed by the job scheduling system 100 and not be scheduled for execution.

In one embodiment, the jobs in the initially scheduled portion 116A may be selected on a random or arbitrary basis. In one embodiment, the first N jobs in the workload may be selected for inclusion in the initially scheduled portion 116A having N jobs. Scheduling a job may include determining a time at which to begin executing the job (e.g., a future point in time), adding a job to a queue for execution when sufficient resources are available, or submitting the job for execution (potentially in a queue) without further delay.

The execution of the scheduled jobs 116A may represent concurrent execution of multiple jobs, often using multiple compute instances or other computing resources operating in parallel. As shown in FIG. 3, the computing resource 190A may be configured for execution 192A of the scheduled jobs, the computing resource 190B may be configured for execution 192B of the scheduled jobs, and the computing resource 190N may be configured for execution 192N of the scheduled jobs. In one embodiment, computing resources of a compute environment 190 may be reserved for use in executing the scheduled portion of the workload. The compute environment 190 may represent a multi-tenant provider network in which resources (e.g., compute instances, storage instances, and so on) may be provisioned from pools of available resources. Alternatively, the compute environment 190 may represent a client computing environment, e.g., a set of computing resources on premises managed by the client whose user submitted the workload. The identity of the compute environment 190 may be selected by the user during submission of the workload or may be selected automatically based on a configuration of the user's account.

One of more resource types of the resources 190A-190N may be selected based (at least in part) on the resource allocation score 135A. The resource types may vary in capability, configuration, availability, cost, and other characteristics. For example, a lower-cost compute instance may be selected for a job with a lower resource allocation score in order to reduce the potential cost of failure. The lower cost may be offered due to the lesser capabilities of the instance and/or the less guaranteed availability of the instance. Conversely, a more expensive compute instance may be selected for a job with a higher resource allocation score. Different jobs may be associated with metadata (potentially in the job definition) that indicates anticipated resource usage or resource requirements, and the selection of different resource types for different jobs may be based (at least in part) on such metadata. The selection of different resource types for different jobs may also be based (at least in part) on one or more policies.

Initiating the execution of a job may include the job scheduling system 100 interacting with a resource manager 180 to provision, configure, and launch one or more compute instances to run the job. In a multi-tenant provider network, a compute instance may represent a virtual compute instance running on a physical compute instance, and the physical compute instance may be selected from a set of different instance types having different configurations or capabilities and potentially a different fee structure for usage. Each instance may be used for one or more jobs in the workload and then deprovisioned or reconfigured for use by the same user or a different user. In one embodiment, a container management system may be used with the virtual compute instances to deploy the program instructions supplied or otherwise referenced by the user. For example, the provisioned instance may be launched using a machine image that implements a container management system. In various embodiments, the instance may be launched before the job is scheduled or in response to the scheduling of the job. After launch, a container on the instance may be filled with the program instructions indicated by the user for performing the job. In one embodiment, jobs may also represent programs (and potentially input data) submitted to a program execution service that manages its own fleet of compute instances.

Using the job execution monitoring functionality 160, the execution (including attempted but failed execution) of the scheduled jobs 116A may be monitored, e.g., for success or failure. The execution may be monitored using any suitable techniques or components, including instrumentation of the compute instances with agent software, the use of an external metric collection service, and/or analysis of exit codes emitted by the programs that run the jobs. The aggregate success or failure of the scheduled jobs 116A may be determined based on automated application of a policy. For example, the execution of the scheduled jobs 116A may be deemed a failure even if not all the jobs failed, e.g., the workload may fail if 20% or more of the individual jobs failed. As another example, the execution of the scheduled jobs 116A may be deemed a success only if all of the individual jobs were successful. The results of the job execution monitoring 160 may be added to the job execution history repository as the job execution history 145A for the scheduled jobs 116A. In one embodiment, the job execution history 145A for the scheduled jobs 116A may be combined with existing statistics related to any of the user identifier, the job identifier, the project identifier, or other relevant elements of the job execution history.

In one embodiment, successful execution of a job may be determined based (at least in part) on a successful launch, e.g., by continued processing of the program without failure for a few seconds after launch. Similarly, unsuccessful execution of a job may be determined based (at least in part) on an unsuccessful launch, e.g., by failed processing of the program within a few seconds after launch. In one embodiment, successful execution of a job may be determined based (at least in part) on a successful exit code generated by the program that runs the job. Similarly, unsuccessful execution of a job may be determined based (at least in part) on an unsuccessful exit code generated by the program that runs the job. The success or failure of exit codes may be determined based on standard exit codes (e.g., 1 for failure and 0 for success) or custom exit codes. In one embodiment, successful execution of a job may be determined based (at least in part) on continued execution of the program without failure at or beyond a particular duration of time, e.g., so that execution may be tentatively deemed successful for a long-running program without needing to wait hours or days. Success or failure of a job may also be determined based (at least in part) on metrics such as resource usage metrics. For example, a job that exceeds a predetermined threshold for processor usage, memory usage, or storage usage may be deemed unsuccessful.

Using the resource allocation scoring functionality 130, a modified resource allocation score 136A may be generated for the unscheduled jobs 117A that represent the remainder of the workload 115A. If the scheduled jobs 116A were executed successfully, then the resource allocation score 136A for the remainder 117A of the workload may be increased to a more trustworthy value. The magnitude of the increase in the score may be determined based on automated application of a policy. The magnitude of the increase in the score may be determined based on the percentage of jobs that were successful in the scheduled portion of the workload. If the scheduled jobs 116A were executed unsuccessfully, then the resource allocation score for the remainder 117A of the workload may be decreased to a less trustworthy value. The magnitude of the decrease in the score may be determined based on automated application of a policy. The magnitude of the increase in the score may be determined based on the percentage of jobs that were unsuccessful in the scheduled portion of the workload.

If the modified resource allocation score 136A is too low, then further processing of the workload (including scheduling of the unscheduled jobs 117A in the remainder of the workload) may be terminated prematurely, and an error or other message (potentially with an explanation of the failure) may be returned to the user. To determine whether to continue processing the workload, the modified resource allocation score 136A for the workload may be compared to a threshold resource allocation score. The threshold resource allocation score may vary and may be determined based on automated application of a policy. For example, for a range of resource allocation scores from 0 (least trustworthy) to 1000 (most trustworthy), further processing may be terminated for a new and unknown user at 200 but for an experienced and generally trusted user at 100.

If the resource allocation score 136A is not too low, then another portion of the workload 115A may be scheduled for execution. If the resource allocation score 136A has increased, then a larger portion of the remainder 117A of the workload (in comparison to the previously scheduled portion 116A of the workload) may be scheduled for concurrent execution. However, if the resource allocation score 136A has decreased, then a same-sized or smaller portion of the remainder 117A of the workload may be scheduled for concurrent execution. The degree of increase or decrease in portion size may be determined based on automated application of a policy. For example, a policy may dictate that the entire remainder of a workload may be scheduled if the resource allocation score has reached a sufficiently high level.

In this manner, the resource usage or throughput of a workload may be throttled based on the estimated trustworthiness of the user, job type, project, or other relevant attributes or associations of the workload. In doing so, the likelihood of mass failure of a large number of jobs may be reduced. For example, without using a resource allocation score to allocate resource usage, a workload containing 10,000 jobs may experience widespread failure if the program associated with those jobs is faulty. As a result, the client may be responsible for resource usage fees even though the desired results of the jobs were not achieved. However, by limiting the number of jobs that are initially executed, the workload may be tested first with a relatively small resource footprint. If a portion of the workload experiences a sufficient degree of failure, then the resource allocation score may be lowered, and potentially further processing of the workload may be terminated. If different portions of the workload are executed successfully, then the resource allocation score may be increased again and again, and larger and larger portions may be scheduled for concurrent execution until the entire workload has been scheduled.

Figure 4:
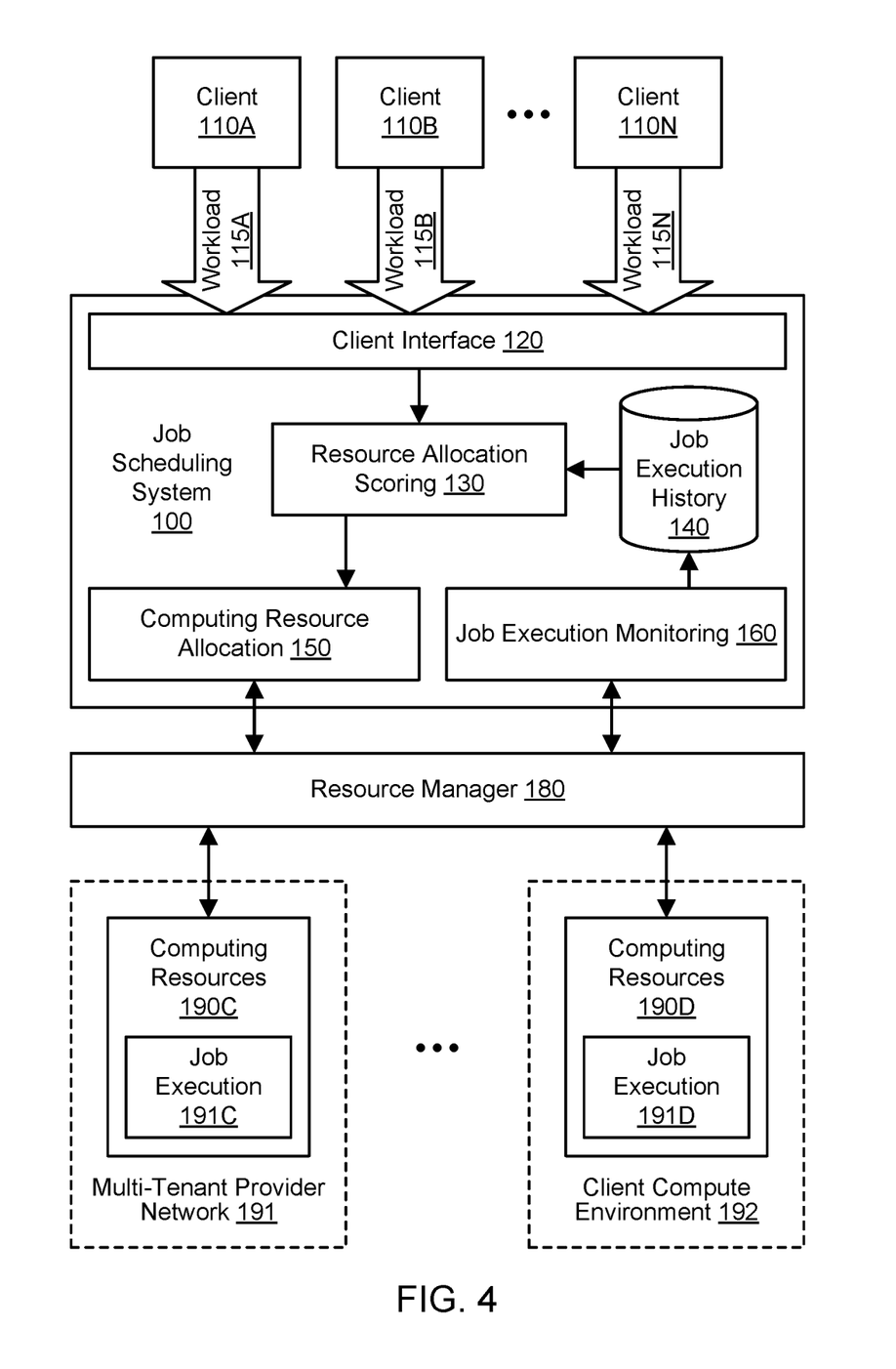
FIG. 4 illustrates further aspects of the example system environment for job scheduling based on job execution history, including execution of jobs in both a multi-tenant provider network and a client compute environment, according to one embodiment.

FIG. 4 illustrates further aspects of the example system environment for job scheduling based on job execution history, including execution of jobs in both a multi-tenant provider network and a client compute environment, according to one embodiment. The execution of jobs in a workload may represent concurrent execution of multiple jobs, often using multiple compute instances or other computing resources operating in parallel. In one embodiment, computing resources of a compute environment may be reserved for use in executing the scheduled portion of the workload. The compute environment may represent a multi-tenant provider network 191 in which computing resources 190C (e.g., compute instances, storage instances, and so on) may be provisioned from pools of available resources. Alternatively, the compute environment may represent a client computing environment 192, e.g., a set of computing resources 190D on premises managed by the client whose user submitted the workload. The computing resources 190C may be configured suitably for job execution 191C of jobs managed using the job scheduling system 100, and the computing resources 190D may also be configured suitably for job execution 191D of jobs managed using the job scheduling system. Multiple such compute environments may be available to some clients, and the identity of the compute environment used for a particular workload may be selected by the user during submission of the workload (e.g., using a suitable API or user interface) or may be selected automatically based on a configuration of the user's account. The client compute environment 192 may typically have more constrained resources than the multi-tenant provider network 191, and so the job scheduling system 100 as described herein may be especially useful for preventing large-scale failure in the provider network 191.

A network set up by an entity such as a company or a public sector organization to provide one or more services (such as various types of network-accessible computing or storage) accessible via the Internet and/or other networks to a distributed set of clients may be termed a provider network. A provider network such as network 191 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 191 in different embodiments, including general purpose or special purpose computer servers, storage devices, network devices, and the like. Because resources of the provider network 191 may be under the control of multiple clients (or tenants) simultaneously, the provider network may be said to offer multi-tenancy and may be termed a multi-tenant provider network. For example, virtual compute instances in the multi-tenant provider network 191 may be concurrently used for the processing of jobs by client 110A as well as by client 110B.

In some embodiments, an operator of the provider network 191 may implement a flexible set of resource reservation, control, and access interfaces for their clients. For example, the resource manager 180 may implement a programmatic resource reservation interface (e.g., via a web site or a set of web pages) that allows clients to learn about, select, purchase access to, and/or reserve compute instances offered by the provider network 191. Such an interface may include capabilities to allow browsing of a resource catalog and provide details and specifications of the different types or sizes of resources supported, the different reservation types or modes supported, pricing models, and so on. The provider network 191 may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client may be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager 180 and may be allocated to some other client that is willing to pay a higher price. Other purchasing modes or combinations of modes may be implemented by the resource manager 180 in some embodiments.

In one embodiment, the provider network 100 may offer virtual compute instances with varying computational and/or memory resources. In one embodiment, each of the virtual compute instances may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the resource manager 180, an instance type may be selected for a job, e.g., based (at least in part) on input from the client. For example, a client may choose an instance type from a predefined set of instance types. As another example, a client may specify the desired resources of an instance type for a job, and the resource manager 180 may select an instance type based on such a specification.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Configurations of virtual compute instances may also include their location in a particular data center or availability zone, geographic location, and (in the case of reserved compute instances) reservation term length.

Figure 5:
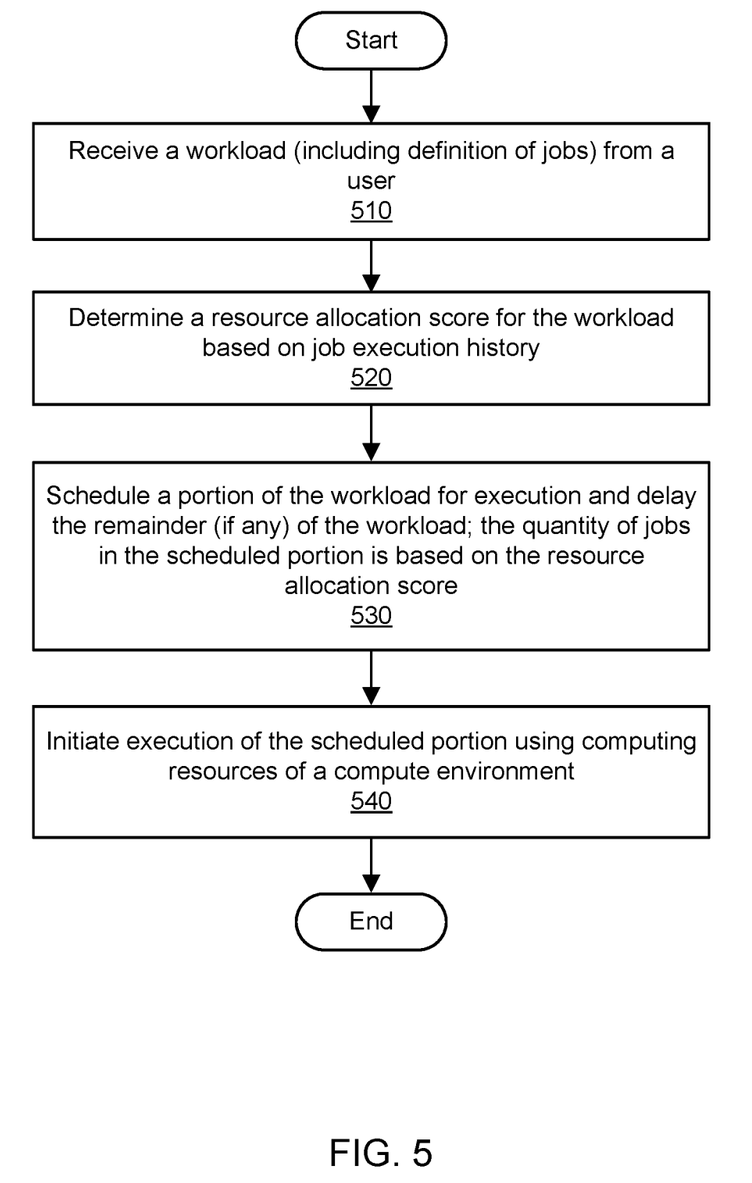
FIG. 5 and FIG. 6 are flowcharts illustrating a method for job scheduling based on job execution history, according to one embodiment.

FIG. 5 is a flowchart illustrating a method for job scheduling based on job execution history, according to one embodiment. As shown in 510, a workload may be received. The workload may be received by a job scheduling system from a user of that system through any appropriate interface(s), including one or more application programming interface(s) (APIs), other programmatic interfaces, and/or user interfaces. The workload may include a set of jobs as defined by one or more job definitions. A job definition may include or reference program instructions to be executed in processing the job. The job definition may include or be associated with a job identifier. A job definition may include or reference a set of input data to be processed using the program instructions. A job definition may also include or be provided with other suitable metadata, including timing information (e.g., a time to begin processing the workload, an anticipated time to run the workload, and/or a deadline), budgetary information, anticipated resource usage, and so on. The user may access the job scheduling system with a user account that is associated with an account name or other user identifier. The user may belong to an organization (e.g., a business entity) that is a client or customer of the job scheduling system, e.g., with an arrangement in place to pay fees for use of the job scheduling system and/or multi-tenant provider network. The user account may be controlled by an individual user or by multiple users within an organization.

As shown in 520, a resource allocation score may be determined for the workload. The resource allocation score may generally represent an estimated likelihood of successful execution of the workload. The resource allocation score may be a numeric value within a particular range, e.g., a value from zero (representing the least trustworthy score) to one thousand (representing the most trustworthy score). The resource allocation score may be a non-numeric value, e.g., a category of trustworthiness such as "poor," "average," "good," or "excellent." The resource allocation score may be determined based (at least in part) on a job execution history. The resource allocation score or job execution history may include multiple components. For example, the job execution history may include the job execution history for a user identifier of the user who submitted the workload, the job execution history for a user group to which the user belongs, the job execution history for a job identifier for the workload, the job execution history for a project identifier for a project to which the workload belongs, or any suitable combination thereof. The job execution history may generally represent any successes and/or failures in attempting to execute jobs in the past. For example, a user's job execution history may include aggregate success metrics for jobs submitted by that user that launched successfully or unsuccessfully, continued processing successfully or unsuccessfully beyond a threshold duration, and/or exited successfully or unsuccessfully. Similarly, the job execution history for a job identifier may include aggregate success metrics for prior attempts to execute the same type of job, such as jobs that launched successfully or unsuccessfully, continued processing successfully or unsuccessfully beyond a threshold duration, and/or exited successfully or unsuccessfully. In one embodiment, both users and workloads may have resource allocation scores, and a user's score may influence the score for a workload submitted by that user.

The resource allocation score may be determined based (at least in part) on automated implementation of one or more policies, e.g., by the job scheduling system. For example, for a user who has no relevant job execution history, a policy may be applied to assign a moderate resource allocation score (e.g., 500 on a scale from 0 to 1000) to the workload to indicate moderate trustworthiness. As another example, for a job type that has no relevant job execution history but is submitted by a user with a sufficiently trustworthy history or resource allocation score, a policy may be applied to assign a moderate resource allocation score (e.g., 500 on a scale from 0 to 1000) to the workload to indicate moderate trustworthiness. After the initial resource allocation score is assigned to a workload or user, a resource allocation score may be raised or lowered based on application of policies. For example, only a small number of failed jobs may cause a resource allocation score to drop steeply based on a policy, potentially based on one or more user attributes. As another example, the degree to which a resource allocation score is raised or lowered for a workload based on execution of a portion of that workload may be affected by a policy, potentially based on one or more user attributes. The velocity at which a resource allocation score is raised may differ from the velocity at which a resource allocation score is lowered based on automated application of a policy. Policies may be default policies or may be set by one or more administrators.

The resource allocation score may also be determined based (at least in part) on a manual exception made by an administrator, e.g., an administrator of the job scheduling system or an administrator of the client organization to which the user belongs. For example, the resource allocation score for a high-ranking member of a client organization may be manually set to a high (trustworthy) score. As another example, an administrator may intervene to raise a low (untrustworthy) score for a particular user as part of a customer support operation.

As shown in 530, an initial portion of the workload may be scheduled for attempted execution. The quantity of jobs in the initially scheduled portion may be determined based (at least in part) on the resource allocation score for the workload. For example, if the resource allocation score is moderate or low, then only 1% of the jobs may be scheduled; if the resource allocation score is high, then 10% of the jobs may be scheduled; and if the resource allocation score is very high, then 50% of the jobs may be scheduled. The mapping of resource allocation scores to percentages of a workload to launch initially may be determined by automated application of a policy. The remainder of the jobs in the workload may be delayed indefinitely, such that those jobs may remain in a queue or other data structure managed by the job scheduling system and not be scheduled for execution. In one embodiment, the jobs in the initially scheduled portion may be selected on a random or arbitrary basis. In one embodiment, the first N jobs in the workload may be selected for inclusion in the initially scheduled portion having N jobs. Scheduling a job may include determining a time at which to begin executing the job (e.g., a future point in time), adding a job to a queue for execution when sufficient resources are available, or submitting the job for execution without further delay.

As shown in 540, execution of the scheduled portion of the workload may be initiated. The execution may represent concurrent execution of multiple jobs, often using multiple compute instances or other computing resources operating in parallel. In one embodiment, computing resources of a compute environment may be reserved for use in executing the scheduled portion of the workload. The compute environment may represent a multi-tenant provider network in which resources (e.g., compute instances, storage instances, and so on) may be provisioned from pools of available resources. Alternatively, the compute environment may represent a client computing environment, e.g., a set of computing resources on premises managed by the client whose user submitted the workload. The identity of the compute environment may be selected by the user during submission of the workload or may be selected automatically based on a configuration of the user's account.

Initiating the execution of a job may include the job scheduling system interacting with a resource manager to provision, configure, and launch one or more compute instances to run the job. In a multi-tenant provider network, a compute instance may represent a virtual compute instance running on a physical compute instance, and the physical compute instance may be selected from a set of different instance types having different configurations or capabilities and potentially a different fee structure for usage. Each instance may be used for one or more jobs in the workload and then deprovisioned or reconfigured for use by the same user or a different user. In one embodiment, a container management system may be used with the virtual compute instances to deploy the program instructions supplied or otherwise referenced by the user. For example, the provisioned instance may be launched using a machine image that includes a container management system. In various embodiments, the instance may be launched before the job is scheduled or in response to the scheduling of the job. After launch, a container may be filled with the program instructions indicated by the user for performing the job. In one embodiment, jobs may also represent programs (and potentially input data) submitted to a program execution service that manages its own fleet of compute instances.

Figure 6:
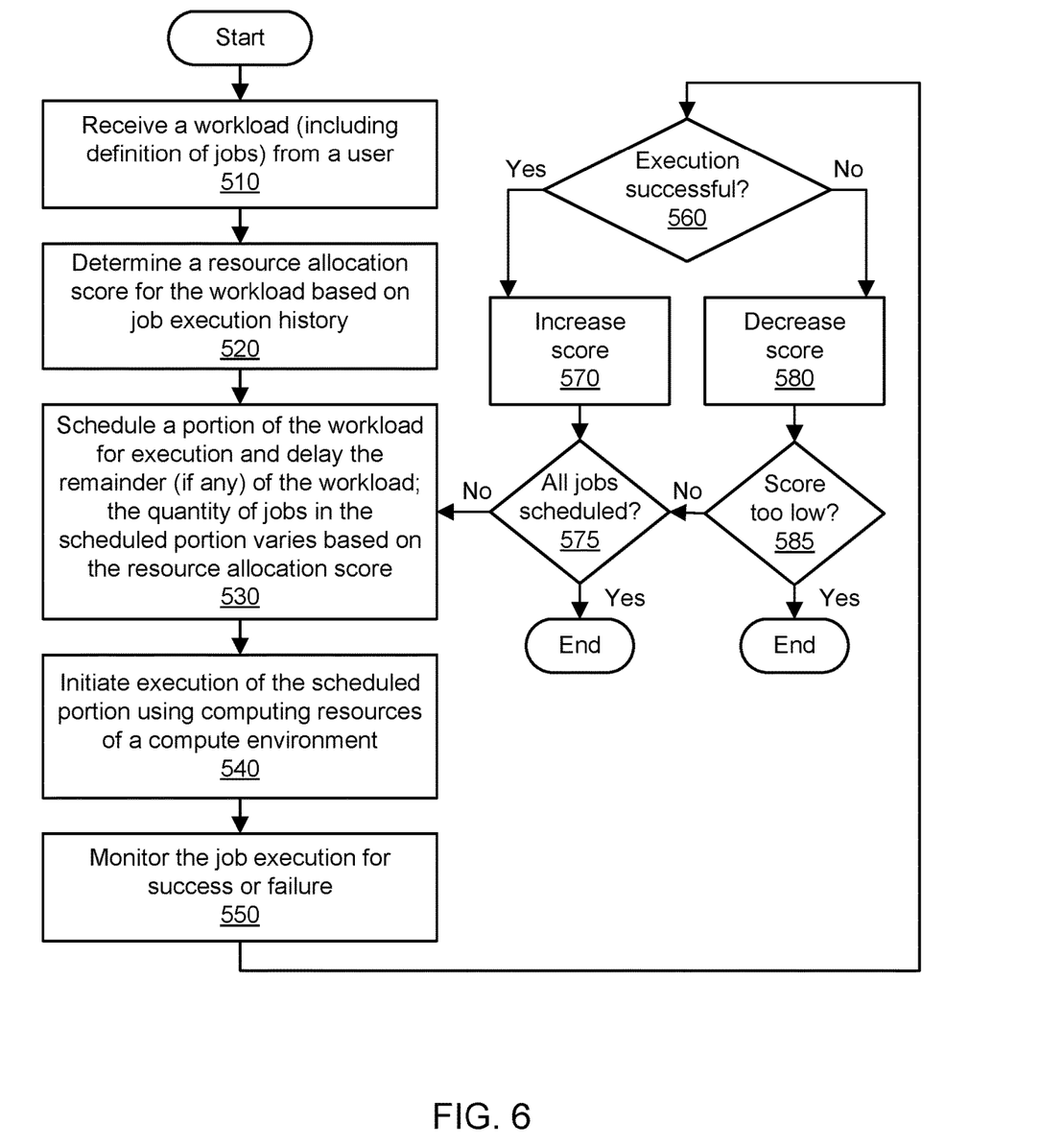

FIG. 6 is a flowchart illustrating further aspects of the method for job scheduling based on job execution history, according to one embodiment. As discussed above and as shown in 510, 520, 530, and 540, execution may be initiated for an initial portion of a workload, and the quantity of jobs in that initial portion may be determined based (at least in part) on a resource allocation score for the workload. As shown in 550, the execution (including attempted but failed execution) of the scheduled portion may be monitored, e.g., for success or failure. The execution may be monitored using any suitable techniques or components, including instrumentation of the compute instances with agent software, the use of an external metric collection service, and/or analysis of exit codes emitted by the programs that run the jobs.

In one embodiment, successful execution of a job may be determined based (at least in part) on a successful launch, e.g., by continued processing of the program without failure for a few seconds after launch. Similarly, unsuccessful execution of a job may be determined based (at least in part) on an unsuccessful launch, e.g., by failed processing of the program within a few seconds after launch. In one embodiment, successful execution of a job may be determined based (at least in part) on a successful exit code generated by the program that runs the job. Similarly, unsuccessful execution of a job may be determined based (at least in part) on an unsuccessful exit code generated by the program that runs the job. The success or failure of exit codes may be determined based on standard exit codes (e.g., 1 for failure and 0 for success) or custom exit codes. In one embodiment, successful execution of a job may be determined based (at least in part) on continued execution of the program without failure at or beyond a particular duration of time, e.g., so that execution may be tentatively deemed successful for a long-running program without needing to wait hours or days. Success or failure of a job may also be determined based (at least in part) on metrics such as resource usage metrics. For example, a job that exceeds a predetermined threshold for processor usage, memory usage, or storage usage may be deemed unsuccessful.

As shown in 560, it may be determined whether execution (or attempted execution) of the portion of the workload was successful or unsuccessful, e.g., based (at least in part) on the criteria discussed with respect to 550. The aggregate success or failure of the portion of the workload may be determined based on automated application of a policy. For example, the portion of the workload may be deemed a failure even if not all the jobs failed, e.g., the workload may fail if 20% or more of the individual jobs failed. As another example, the portion of the workload may be deemed a success only if all of the individual jobs were successful.

As shown in 570, if the portion of the workload was executed successfully, then the resource allocation score for the workload (e.g., for the unscheduled remainder of the workload) may be increased to a more trustworthy value. The magnitude of the increase in the score may be determined based on automated application of a policy. The magnitude of the increase in the score may be determined based on the percentage of jobs that were successful in the portion of the workload.

As shown in 580, if the portion of the workload was executed unsuccessfully, then the resource allocation score for the workload (e.g., for the unscheduled remainder of the workload) may be decreased to a less trustworthy value. The magnitude of the decrease in the score may be determined based on automated application of a policy. The magnitude of the increase in the score may be determined based on the percentage of jobs that were unsuccessful in the portion of the workload.

As shown in 585, if the resource allocation score was decreased, then it may be determined whether the resource allocation score is too low to continue further processing of this workload. If so, then further processing of the workload (including scheduling of jobs in the remainder of the workload) may be terminated prematurely, and an error or other message (potentially with an explanation of the failure) may be returned to the user. To determine whether to continue processing the workload, the modified resource allocation score for the workload may be compared to a threshold resource allocation score. The threshold resource allocation score may vary and may be determined based on automated application of a policy. For example, for a range of resource allocation scores from 0 (least trustworthy) to 1000 (most trustworthy), further processing may be terminated for a new and unknown user at 200 but for an experienced and generally trusted user at 100.

As shown in 575, it may be determined whether all the jobs in the workload have been scheduled. If so, then further processing of this workload (including scheduling of jobs in the remainder of the workload) may be terminated successfully. If not, then the method may return to the operation shown in 530. If the resource allocation score has increased, then a larger portion of the remainder of the workload (in comparison to the previously scheduled portion of the workload) may be scheduled for concurrent execution. However, if the resource allocation score has decreased, then a same-sized or smaller portion of the remainder of the workload may be scheduled for concurrent execution. The degree of increase or decrease in portion size may be determined based on automated application of a policy. For example, a policy may dictate that the entire remainder of a workload may be scheduled if the resource allocation score has reached a sufficiently high level.

In this manner, the resource usage or throughput of a workload may be throttled based on the estimated trustworthiness of the user, job type, project, or other relevant attributes or associations of the workload. In doing so, the likelihood of mass failure of a large number of jobs may be reduced. For example, without using a resource allocation score to allocate resource usage, a workload containing 10,000 jobs may experience widespread failure if the program associated with those jobs is faulty. As a result, the client may be responsible for resource usage fees even though the desired results of the jobs were not achieved. However, by limiting the number of jobs that are initially executed, the workload may be tested first with a relatively small resource footprint. If a portion of the workload experiences a sufficient degree of failure, then the resource allocation score may be lowered, and potentially further processing of the workload may be terminated. If different portions of the workload are executed successfully, then the resource allocation score may be increased again and again, and larger and larger portions may be scheduled for concurrent execution until the entire workload has been scheduled.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   a plurality of computing resources of a multi-tenant provider network; and
   one or more computing devices configured to implement a job scheduling system, wherein the job scheduling system is configured to:
   receive a request to schedule a set of jobs, wherein the set of jobs is associated with a user account;
   determine a resource allocation score based at least in part on whether or not previous jobs completed successfully according to a job execution history for the user account;
   determine, based on the resource allocation score, a quantity of the set of jobs to be scheduled for concurrent execution at a future time, wherein the determined quantity of jobs to be scheduled for concurrent execution varies for different values of the resource allocation score;
   schedule a first portion of the set of jobs for concurrent execution at the future time, wherein the first portion comprises the determined quantity of the set of jobs, and wherein execution of a remaining portion of the set of jobs is delayed;
   reserve one or more of the computing resources of the multi-tenant provider network for the first portion of the set of jobs; and
   initiate, at the scheduled time, the concurrent execution of the first portion of the set of jobs using the reserved one or more of the computing resources of the multi-tenant provider network.

2. The system as recited in claim 1, wherein the job scheduling system is further configured to:
   monitor the execution of the first portion of the set of jobs;
   determine a modified resource allocation score, wherein the modified resource allocation score is determined based at least in part on the execution of the first portion of the set of jobs;
   schedule a second portion of the set of jobs for concurrent execution, wherein a quantity of jobs in the second portion of the set of jobs is determined based at least in part on the modified resource allocation score; and
   initiate the concurrent execution of the second portion of the set of jobs using the computing resources of the multi-tenant provider network.

3. The system as recited in claim 1, wherein the set of jobs is associated with one or more job identifiers, and wherein the resource allocation score is determined based at least in part on a job execution history for the one or more job identifiers.

4. A computer-implemented method, comprising:
   determining a resource allocation score based at least in part on whether or not previous jobs completed successfully according to a job execution history for a user account;
   determine, based on the resource allocation score, a quantity of a set of jobs to be scheduled for execution at a future time, wherein the quantity of jobs to be scheduled for execution varies for different values of the resource allocation score;
   scheduling a first portion of the set of jobs for execution at the future time, wherein the first portion comprises the determined quantity of the set of jobs, and wherein execution of a remaining portion of the set of jobs is delayed; and
   initiating, at the scheduled time, the execution of the first portion of the set of jobs.

5. The method as recited in claim 4, wherein the set of jobs is associated with the user account.

6. The method as recited in claim 4, wherein the set of jobs is associated with one or more job identifiers, and wherein the resource allocation score is determined based at least in part on a job execution history for the one or more job identifiers.

7. The method as recited in claim 4, wherein the set of jobs is associated with a project identifier, and wherein the resource allocation score is determined based at least in part on a job execution history for the project identifier.

8. The method as recited in claim 4, further comprising:
   monitoring the execution of the first portion of the set of jobs;
   determining a modified resource allocation score, wherein the modified resource allocation score is determined based at least in part on the execution of the first portion of the set of jobs;

scheduling a second portion of the set of jobs for execution, wherein a quantity of jobs in the second portion of the set of jobs is determined based at least in part on the modified resource allocation score; and initiating the execution of the second portion of the set of jobs.

9. The method as recited in claim 8, wherein monitoring the execution of the first portion of the set of jobs comprises, for an individual job in the first portion in the set of jobs:

determining whether a launch of the individual job is successful or unsuccessful; and if the launch is successful, determining whether an exit of the individual job is successful or unsuccessful.

10. The method as recited in claim 8, wherein monitoring the execution of the first portion of the set of jobs comprises, for an individual job in the first portion in the set of jobs:

determining whether the individual job has continued to execute without an unsuccessful exit for a period of time.

11. The method as recited in claim 4, further comprising:

increasing the resource allocation score based at least in part on successful aggregate execution of the first portion of the set of jobs; or decreasing the resource allocation score based at least in part on unsuccessful execution of one or more jobs in the first portion of the set of jobs.

12. The method as recited in claim 4, further comprising:

determining that the resource allocation score has fallen below a threshold score; and suspending further execution of the set of jobs.

13. The method as recited in claim 4, wherein the resource allocation score is determined using automated implementation of one or more policies by a job scheduling system.

14. The method as recited in claim 4, further comprising:

reserving one or more computing resources of a multi-tenant provider network for the execution of the first portion of the set of jobs, wherein the first portion of the set of jobs is executed using the one or more computing resources.

15. The method as recited in claim 4, further comprising:

reserving one or more computing resources of a compute environment for the execution of the first portion of the set of jobs, wherein one or more resource types of the computing resources are selected based at least in part on the resource allocation score.

16. A non-transitory computer-readable storage medium storing program instructions computer-executable to perform:

receiving a request to schedule a workload comprising a plurality of jobs, wherein the plurality of jobs is associated with a user account;

determining a resource allocation score based at least in part on whether or not previous jobs completed successfully according to a job execution history for the user account;

determining, based on the resource allocation score, a quantity of the plurality of jobs to be scheduled for concurrent execution at a future time, wherein the determined quantity of jobs to be scheduled for concurrent execution varies for different values of the resource allocation score;

scheduling a first portion of the plurality of jobs for concurrent execution at the future time, wherein the first portion comprises the determined quantity of the plurality of jobs, and wherein execution of a remaining portion of the plurality of jobs is delayed; and initiating, at the scheduled time, the concurrent execution of the first portion of the plurality of jobs.

17. The non-transitory computer-readable storage medium as recited in claim 16, wherein the workload is associated with a user identifier, and wherein the resource allocation score is determined based at least in part on a job execution history for the user identifier.

18. The non-transitory computer-readable storage medium as recited in claim 16, wherein the workload is associated with one or more job identifiers, and wherein the resource allocation score is determined based at least in part on a job execution history for the one or more job identifiers.

19. The non-transitory computer-readable storage medium as recited in claim 16, wherein the program instructions are further computer-executable to perform:

monitoring the execution of the first portion of the plurality of jobs;

determining a modified resource allocation score for the plurality of jobs, wherein the modified resource allocation score is determined based at least in part on the execution of the first portion of the plurality of jobs, and wherein the modified resource allocation score represents at least in part an estimated likelihood of successful execution of the remaining portion of the plurality of jobs;

scheduling a second portion of the plurality of jobs for concurrent execution, wherein a quantity of jobs in the second portion of the plurality of jobs is determined based at least in part on the modified resource allocation score; and initiating the concurrent execution of the second portion of the plurality of jobs.

20. The non-transitory computer-readable storage medium as recited in claim 16, wherein the program instructions are further computer-executable to perform:

increasing the resource allocation score based at least in part on successful aggregate execution of the first portion of the plurality of jobs; or decreasing the resource allocation score based at least in part on unsuccessful execution of one or more jobs in the first portion of the plurality of jobs.

* * * * *